US008348742B2

(12) United States Patent
Yacenda

(10) Patent No.: US 8,348,742 B2
(45) Date of Patent: Jan. 8, 2013

(54) SYSTEM AND METHOD FOR OPERATING GOVERNMENTAL LOTTERY GAMES WITH TELEVISION-BASED USER TERMINALS

(75) Inventor: Michael W. Yacenda, Stamford, CT (US)

(73) Assignee: Elottery, Inc., Stamford, CT (US)

( * ) Notice: Subject to any disclaimer, the term of this patent is extended or adjusted under 35 U.S.C. 154(b) by 465 days.

(21) Appl. No.: 12/361,258

(22) Filed: Jan. 28, 2009

(65) Prior Publication Data

US 2009/0137304 A1 May 28, 2009

Related U.S. Application Data

(63) Continuation-in-part of application No. 12/192,820, filed on Aug. 15, 2008, now Pat. No. 8,192,269, which is a continuation-in-part of application No. 11/546,945, filed on Oct. 12, 2006, now Pat. No. 7,946,913, which is a continuation-in-part of application No. 11/071,607, filed on Mar. 3, 2005, now Pat. No. 7,931,529, which is a continuation of application No. 10/000,795, filed on Nov. 2, 2001, now Pat. No. 6,869,358, which is a continuation-in-part of application No. 09/458,326, filed on Dec. 10, 1999, now Pat. No. 6,322,446.

(51) Int. Cl.
*A63F 9/24* (2006.01)
*A63F 13/00* (2006.01)

(52) U.S. Cl. .......................................................... 463/17

(58) Field of Classification Search .................... 463/17, 463/16

See application file for complete search history.

(56) References Cited

U.S. PATENT DOCUMENTS

| | | | |
|---|---|---|---|
| 4,713,837 | A | 12/1987 | Gordon |
| 4,815,741 | A | 3/1989 | Small |
| 4,842,278 | A | 6/1989 | Markowicz |
| 4,922,522 | A | 5/1990 | Scanlon |
| 5,083,272 | A | 1/1992 | Walker et al. |
| 5,326,104 | A | 7/1994 | Pease et al. |
| 5,646,839 | A | 7/1997 | Katz |
| 5,954,582 | A | 9/1999 | Zach |
| 5,979,894 | A | 11/1999 | Alexoff |

(Continued)

FOREIGN PATENT DOCUMENTS

WO WO 95/10098 4/1995

(Continued)

OTHER PUBLICATIONS

International Search Report dated Sep. 22, 2009.

(Continued)

*Primary Examiner* — William D Coleman
*Assistant Examiner* — Christine Enad
(74) *Attorney, Agent, or Firm* — F. Chau & Associates, LLC

(57) ABSTRACT

A method for facilitating governmental lottery play over television includes receiving a lottery ticket purchase request from a player terminal including a television over a television service provider communication network. Personal information pertaining to a player is retrieved from a subscriber database of the television service provider. It is then verified that the player satisfies predetermined criteria based on the retrieved personal information. The purchase of a lottery ticket is processed based on the received lottery ticket purchase request when it is verified that the player satisfies the predetermined criteria.

20 Claims, 9 Drawing Sheets

U.S. PATENT DOCUMENTS

| | | | |
|---|---|---|---|
| 6,017,032 | A | 1/2000 | Grippo et al. |
| 6,024,641 | A | 2/2000 | Sarno |
| 6,069,890 | A | 5/2000 | White et al. |
| 6,080,062 | A | 6/2000 | Olson |
| 6,086,477 | A | 7/2000 | Walker et al. |
| 6,102,400 | A | 8/2000 | Scott et al. |
| 6,146,272 | A | 11/2000 | Walker et al. |
| 6,154,172 | A | 11/2000 | Piccionelli et al. |
| 6,168,521 | B1 | 1/2001 | Luciano et al. |
| 6,183,361 | B1 | 2/2001 | Cummings et al. |
| 6,251,016 | B1 | 6/2001 | Tsuda et al. |
| 6,277,026 | B1 * | 8/2001 | Archer ............................ 463/42 |
| 6,383,078 | B1 | 5/2002 | Yacenda |
| 6,599,186 | B1 | 7/2003 | Walker et al. |
| 6,874,783 | B2 | 4/2005 | Higginson |
| 2001/0003100 | A1 | 6/2001 | Yacenda |
| 2001/0031661 | A1 | 10/2001 | Wiltshire et al. |
| 2002/0147049 | A1 | 10/2002 | Carter, Sr. |
| 2002/0174444 | A1 * | 11/2002 | Gatto et al. ................... 725/133 |
| 2004/0060064 | A1 * | 3/2004 | Poli ................................. 725/61 |
| 2004/0259626 | A1 | 12/2004 | Akram et al. |
| 2005/0153779 | A1 | 7/2005 | Ziegler |
| 2005/0215306 | A1 * | 9/2005 | O'Donnell et al. ............. 463/17 |
| 2006/0035697 | A1 | 2/2006 | Packes et al. |
| 2007/0060284 | A1 | 3/2007 | Yacenda |

FOREIGN PATENT DOCUMENTS

| | | |
|---|---|---|
| WO | WO 01/18759 | 3/2001 |
| WO | WO 01/70359 | 9/2001 |
| WO | WO 01/71677 | 9/2001 |

OTHER PUBLICATIONS

Statement of Grounds and Particulars in Support of Opposition dated Oct. 2, 2009 by South Wales Lotteries Corporation.

Statement of Grounds and Particulars in Support of Opposition dated Sep. 25, 2009 by Manaccom Corporation Ltd.

Dreams Come true website (www.dreamscometrue.com.au), Oct. 8, 2009.

US 5,823,877, 10/1998, Scagnelli et al. (withdrawn)

* cited by examiner

SYSTEM AND METHOD FOR OPERATING GOVERNMENTAL LOTTERY GAMES WITH TELEVISION-BASED USER TERMINALS

RELATED APPLICATION DATA

The present application is a continuation-in-part of commonly assigned application Ser. No. 12/192,820, filed Aug. 15, 2008 now U.S. Pat. No. 8,192,269, which is a continuation-in-part of commonly assigned application Ser. No. 11/546,945, filed Oct. 12, 2006 now U.S. Pat. No. 7,946,913, which is a continuation-in-part of commonly assigned application Ser. No. 11/071,607, filed Mar. 3, 2005 now U.S. Pat. No. 7,931,529, which is a continuation of commonly assigned application Ser. No. 10/000,795, filed Nov. 2, 2001, now U.S. Pat. No. 6,869,358, issued Mar. 22, 2005, which is a continuation-in-part of commonly assigned application Ser. No. 09/458,326, filed on Dec. 10, 1999, now U.S. Pat. No. 6,322,446, issued Nov. 27, 2001.

BACKGROUND OF THE INVENTION

1. Technical Field

The present invention relates to a system and a method for playing lottery games via an electronic network, and more particularly to a system and a method for operating or facilitating state lottery games with television-based user terminals.

2. Discussion of the Related Art

In traditional lottery games, lottery players walk into convenience retailers, manually fill out selection slips, and exchange cash or credit with a clerk, who then enters the selections into a lottery terminal. This lottery terminal electronically connects to a central lottery system which manages the lottery games. The central game system then issues a coded lottery ticket, and the lottery ticket is delivered to the lottery players through the local lottery terminal at the retailer. To play lottery games administered by governmental entities such as countries, states, provinces or multi-state lottery associations, lottery players are required to travel to retailers and sometimes wait in line to purchase lottery tickets.

Numerous interactive games on the Internet are now available. These include both games of skill or games of chance (wager) such as virtual casinos. However, lottery games such as lotteries offered by the governmental entities have not been made available on the Internet. One reason may be concern regarding security and fraud as to forged winning tickets. Also, it may be more difficult to verify play criteria such as the age or residence of the lottery players. If governmental entities' lottery tickets can be purchased by players over publicly accessible electronic or telephonic network such as the Internet, it can be anticipated that many more players will participate in the lottery. Many more tickets will be sold and awards will be much larger. If online lottery play of a governmental lottery is possible, other features such as subscription play wherein players subscribe to a periodic play of same numbers can be added, thereby making lottery gaming even more attractive.

The Internet, however, is not the only means of providing content to the user. Television systems have long been used to bring content into the home and/or provide content to where ever a user may be located. While up until fairly recently, television allowed for a one-way content transfer whereby a television network, cable television provider, or similar television content provider, recent advances such as digital cable television systems may allow for two-way communication between the television user and the television provider.

While cable television providers and similar television service providers maintain networks that can allow for two-way communication, this capability has thus far only been used to deliver television programming, with return communication from user to cable television provider being essentially limited to the ordering of video-on-demand and other value-added services provided by the television service operator.

Therefore, a need exists for a lottery agent system which facilitates lottery play of governmental lotteries via an electronic network such as through the Internet or through a television content-delivery system. A need also exists for a lottery agent system which makes available through the electronic network the purchase of governmental lottery tickets and facilitates additional features such as subscription play and instant play.

The U.S. Wire Act restricts the purchase of lottery tickets over the Internet without knowingly accepting information assisting in the placing of bets or wagers from persons located outside the state at the time of purchase. Pending U.S. legislation proposes rules to permit intrastate Internet wagering provided state regulations include reasonably designed verification of age and location to prevent access to minors and persons located outside the state and appropriate data security standards to prevent access by unverified persons whose age and current location do not satisfy state laws or regulations.

Existing geolocation technology relates an IP Address to a geographic location. However, since IP addresses are registered to a country, geolocation technology can determine a country, but state-level accuracy is limited. Proprietary databases claim to determine a more precise geography at a city or regional level. Geolocation limitations prevent absolute assurance of in state location.

Accordingly, geolocation technology has insufficient accuracy and is prone to circumvention. For example, self-proclaimed market leader, Quova, publicizes an accuracy of only 94%. Geolocation software can be circumvented easily where a player can access the Internet from any state by using an Internet access dial-in number in the desired state. For example, the Internet service provider AOL maintains a large set of dial-in numbers all across the United States. AOL routes their Internet traffic in a complex manner that confounds geolocation software. Accordingly, conventional geolocation techniques cannot determine the state from which an AOL user originates.

Moreover, Internet users may utilize proxy server to mask their location. A proxy server is a server that acts as an intermediary between the user and the desired website. Because the proxy server handles communication with the desired website, it may appear to the website that the user is actually located at the site of the proxy server. By selecting an appropriately located proxy server, a user may make him or herself appear to be in any desired location, thus confounding geolocation techniques.

Moreover, it is becoming increasingly common for users to access the Internet from a wide variety of mobile electronic devises such as laptop computers, cellular telephones/smartphones, PDAs and other mobile devices. These mobile devices may connect to the Internet in a wide variety of ways, including WiFi connections, WiMax connections, and cellular connections such as over an EVDO network such as those provided by Sprint Nextel Corporation and Verizon Wireless or over a GPRS/UMTS network such as those provided by AT&T Mobility or T-Mobile.

Conventional geolocation techniques may be partially or entirely useless when trying to identify the location of a user who is accessing the Internet wirelessly through one or more of these or other mobile solutions.

Moreover, there are many people who find a television more accessible than a home computer system. For these people, performing particular functions from the television may be more appealing than using a home computer system connected to the Internet. Accordingly, a need exists for a lottery agent system which facilitates lottery play of governmental lotteries via a television service provider network.

SUMMARY OF THE INVENTION

A method for facilitating governmental lottery play over television includes receiving a lottery ticket purchase request from a player terminal including a television over a television service provider communication network. Personal information pertaining to a player is retrieved from a subscriber database of the television service provider. It is then verified that the player satisfies predetermined criteria based on the retrieved personal information. The purchase of a lottery ticket is processed based on the received lottery ticket purchase request when it is verified that the player satisfies the predetermined criteria.

The lottery ticket purchase request may be generated by the player's interaction with a set-top-box that is part of the player terminal, via a remote control. The television service provider may be a cable television provider and the television service provider communication network is a cable television network. The television service provider may be a fiber optic television provider and the television service provider communication network may be a fiber optic television network. The television service provider may be a satellite television provider and the television service provider communication network may be a satellite television network. The television service provider may be a local area hotel or cruise ship television system and the television service provider communication network is local television system.

The lottery ticket purchase request may include a personal identification number (PIN) that is provided by the player in order to access restricted content or services. The subscriber database may include the location, residency and age of the player. Verifying that the player satisfies predetermined criteria based on the retrieved personal information may include verifying that the player lives in and is located within a particular geographic jurisdiction and verifying that the player is of at least a certain age.

A lottery ticket purchase fee may be settled via the television service provider's subscriber account. Lottery ticket winnings may be settled via the television service provider's subscriber account when the winnings are below a particular threshold.

A system for facilitating a governmental lottery play over television includes a player terminal with a display device, a digital television provision unit, and a console for the digital television provision unit, the player terminal receiving a lottery ticket purchase request from a player over a television service provider communication network; a subscriber database for retrieving personal information pertaining to the player; a verification unit for verifying that the player satisfies predetermined criteria based on the retrieved personal information; a lottery transaction server for processing the purchase of a lottery ticket based on the received lottery ticket purchase request when it is verified that the player satisfies the predetermined criteria; and a government lottery administrator server for providing information for determining whether the purchased lottery ticket is a winning ticket or a losing ticket.

The display device may be a television set and the digital television provision unit may be a television set-top-box. The television set-top-box may be a cable box. The television set-top-box may be a cableCARD enabled set-top-box. The display device and the television set-top-box may be embodied in a single television device that is cableCARD enabled.

A method for facilitating governmental lottery play over television includes receiving a lottery ticket purchase request from a player terminal with a display device, a digital television provision unit, and a console for the digital television provision unit, over a television service provider communication network; retrieving personal information pertaining to a player from a subscriber database of the television service provider; verifying that the player satisfies predetermined criteria based on the retrieved personal information; and processing the purchase of a lottery ticket based on the received lottery ticket purchase request when it is verified that the player satisfies the predetermined criteria.

The display device may be a television set and the digital television provision unit may be a cableCARD enabled set-top-box or a cable box. The television service provider may be a cable television provider and the television service provider communication network may be a cable television network. The television service provider may be a fiber optic television provider and the television service provider communication network may be a fiber optic television network.

BRIEF DESCRIPTION OF THE DRAWINGS

This disclosure will present in detail the following description of preferred embodiments with reference to the following figures wherein.

DETAILED DESCRIPTION OF EXEMPLARY EMBODIMENTS

Figure 1:
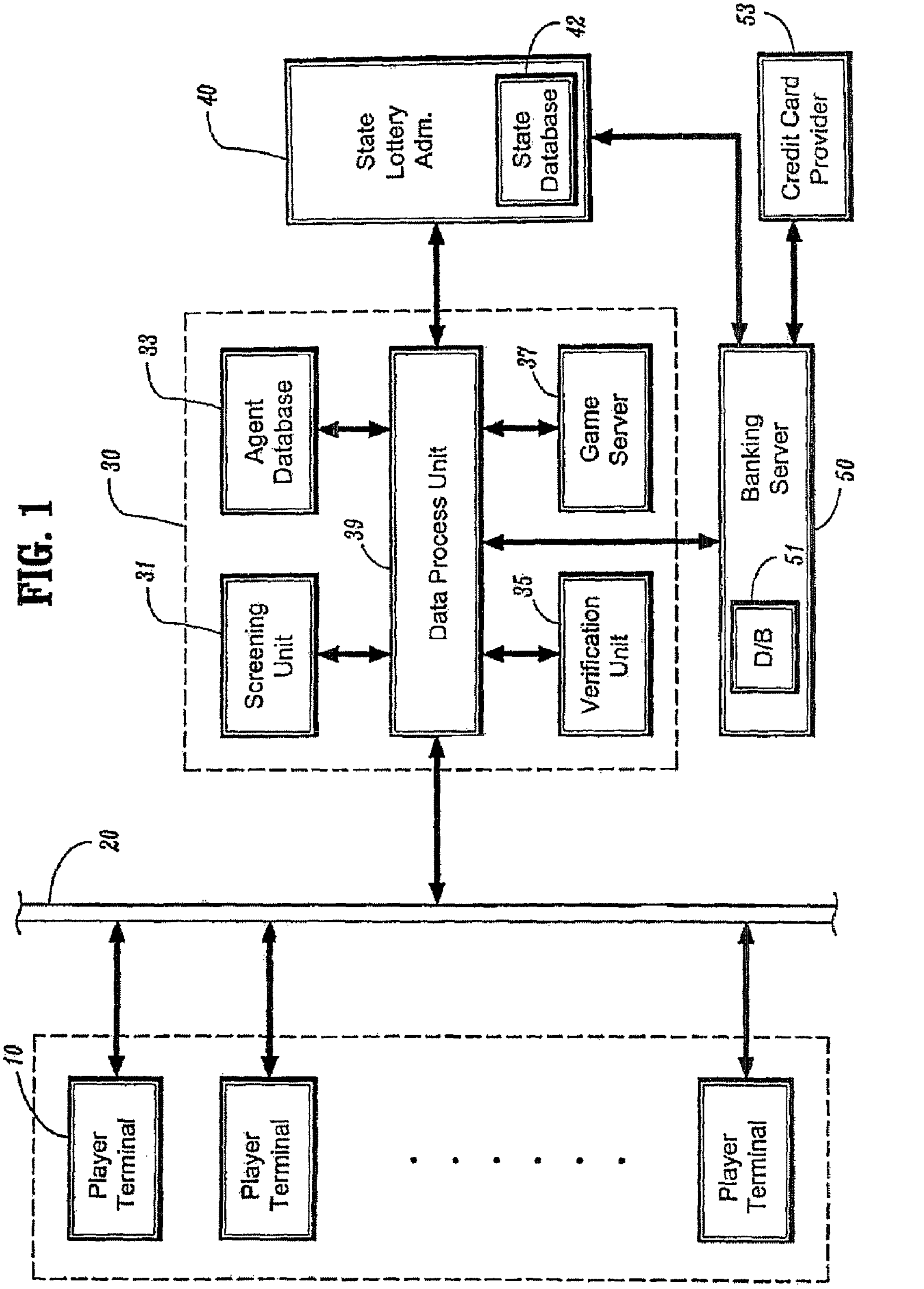
FIG. 1 is a block diagram illustrating a preferred embodiment of a lottery agent system according to the present invention.

The present disclosure describes a lottery agent system for facilitating lottery games which makes it possible to purchase lottery tickets and to play lottery games at player terminals through a communication network. The lottery agent system of the present invention more particularly relates to playing lottery games provided by a governmental entity such as a country, county, state, province or multi-state lottery association (hereafter referred to as "state"). The system includes an agent server for interacting with lottery players and lottery administrators of the states to manage and facilitate the state lottery games. For example, lottery players access the agent server via an electronic network such as the Internet or via a television service provider to purchase lottery tickets at the player terminals, such as personal computers, television sets, or lottery terminals, for playing lottery games.

Exemplary embodiments of the present disclosure that involve the use of a player terminal, for example, implemented on a television set, that is in communication with a television service provider, are described in detail below. However, it is to be understood that all details discussed herein may be readily adapted to the television-provider approach, even where described as part of an internet-based approach.

The lottery players enter player information, such as names, addresses, ages, and accounts of the lottery players, and ticket information of the lottery tickets to be purchased. The types of games include the traditional periodic games (which draw winning numbers twice a week, weekly or monthly etc.), instant games wherein players learn whether they have won nearly instantaneously, or subscription games. The players purchase lottery on a subscription basis by entering subscription play information such as the lottery numbers, the amount of wager, and the duration or number of plays using the lottery numbers. The accounts may be credit card accounts or bank accounts of the lottery players, or separate accounts or other payment method such as prepaid account cards established by the agent server for the lottery players for the use of lottery games. Upon receiving the player and ticket information, the agent server verifies based on the player information of the lottery players that each lottery player satisfies certain criteria required by the state.

After such verification of the lottery players, the agent server sends the ticket information via the Internet to each state lottery administrator which then provides the agent server with security or serial numbers associated with each lottery ticket purchased. The security or serial numbers (hereinafter referred to as "serial numbers") are preferably encrypted numbers. Each ticket sold is assigned a unique serial number by the state. In the case of instant lottery games, the instant tickets and associated serial numbers are prestored in a database at the agent server. The agent server transmits lottery game data to the player terminals of the lottery players upon confirmation of the purchase of the lottery tickets.

Upon drawing winning numbers, the agent server verifies winning tickets of which ticket numbers match the winning numbers, based on the serial numbers received from the state lottery administrator. The agent server then notifies the lottery players of the verified winning tickets.

The agent server also transmits to the state lottery administrator the ticket information of the winning tickets including the serial numbers associated with the winning tickets. The state lottery administrator verifies the ticket information received from the agent server with the ticket information previously stored in a state database. Upon a successful verification, the state lottery administrator issues claim validation numbers associated with the verified winning tickets for the future claims on lottery awards by winning players. The claim validation numbers issued by the state lottery administrator are stored in the state database and transmitted to the agent server.

The lottery agent system may also include a banking server which interacts with the agent server and the each state lottery administrator and credits an account of each winning player with a winning amount provided by the each state administrator and debits the account for purchase of the lottery tickets.

Thus, a lottery agent system of the present invention performs a screening and a verification process. Preferably, upon receiving the player and ticket information, the agent server screens each lottery player for satisfaction of criteria set by the states. Upon purchase of a ticket, the serial number associated with each ticket is stored. Upon a drawing of winning numbers, the agent server verifies winning tickets with the player's information, serial numbers and validation numbers issued by each state administrator and stored in a database of the agent server.

FIG. 1 shows a preferred embodiment of a lottery agent system according to the present invention. Player terminals 10 are used by lottery players to enter information for playing lottery games. The player terminals 10 may be personal computers of the lottery players and/or lottery terminals specifically for playing lottery games and located at readily accessible places. To purchase lottery tickets, the lottery players enter at the player terminals 10 player information, such as age and address, account number of the player, and ticket information, such as types and numbers of lottery tickets to be purchased, including specifying instant play or subscription play as a subscriber. The player and ticket information is transferred via a communication network 20 to an agent server 30. The communication network 20 is preferably a global electronic network such as the Internet through which a lottery website is provided for the lottery players to log on.

The agent server 30 includes a plurality of program modules having stored codes executable by a data process unit 39 for effecting agent server functions including communicating over the electronic network. Other modules include a screening unit 31 for verifying based on the player information that each lottery player satisfies certain criteria required for playing lottery games, an agent database 33 for storing the player and ticket information and serial numbers generated by a state lottery administrator 40, a verification unit 35 for verifying winning tickets based on the ticket information and the serial numbers after a drawing of winning numbers, a game server 37 for storing and providing various types of lottery games. The data process unit 39 also communicates control and data signals with the above and other components of the agent server 30. The game server 37 includes a subscription play unit (not shown) for monitoring subscription play and putting in play the subscription lottery numbers for a pre-specified number of draws until expiration of the specified subscription time period. Detail description of the agent server 30 in FIG. 1 follows.

When a lottery player enters his/her player and ticket information at a player terminal 10 to purchase lottery tickets, the screening unit 31 receives the player and ticket information and verifies based on the player information that the lottery player satisfies certain criteria required by the state. The criteria, for example, minimum age and residency within the border of the state, are set by the state as a condition to purchase lottery tickets. Such criteria may be previously stored in the screen unit 31. For the verification, the screening unit 31 compares the criteria with the player information to confirm that each and every requirement of the criteria is satisfied with each corresponding data of the player information. For example, the screen unit 31 may perform comparison and determination with respect to whether the lottery player's age is over the minimum age, whether the lottery player's address falls within the border of the state, and so on. If the player information is successfully verified by the screening unit 31, the verified player information along with the ticket information is stored in the agent database 33 under the control of the data process unit 39. Upon such verification, the ticket information is transmitted to the state lottery administrator 40 under the control of the data process unit 39. Upon receiving and storing the ticket information in a state database 42, the state lottery administrator 40 issues serial numbers associated with the lottery tickets to be purchased in accordance with the ticket information. Each of the serial numbers is associated with each of the lottery tickets to be purchased. That is, each serial number is unique to each lottery ticket to be purchased. The serial numbers are then transmitted to and stored in the agent database 33 under the control of the data process unit 39. In the case of instant lottery games, winning numbers can be pre-drawn and the serial numbers associated with tickets pre-stored in the agent server. Thus, the instant ticket can be presented to the player immediately upon verification of player information.

Upon receiving the serial numbers associated with the lottery tickets from the state lottery administrator 40, the data process unit 39 confirms the purchases of the lottery tickets and generates control signals to the game server 37 for playing lottery games. In response to the control signals from the data process unit 39, the game server 37 provides the player terminal 10 with image data in the form of the lottery tickets purchased. The player terminal 10 displays on its screen virtual lottery tickets corresponding to the image data of the lottery tickets purchased. The image data may include ticket numbers selected by the lottery player and the serial numbers associated with the lottery tickets. The game server 37 may previously store image data of various types of lottery tickets. The lottery player can then play lottery games with the virtual lottery tickets displayed on the player terminal 10. That is, the lottery player observes a drawing of winning numbers and matches between the winning numbers and the ticket numbers of the virtual lottery tickets. The lottery player can also interactively communicate with the agent server 30 via the Internet 20 while playing lottery games.

The players can also select subscription play from the types of games made available to players from agent server 30. A player selects from the website operated by the agent server 30 the subscription play icon. A subscription form appears to prompt the player to enter subscription play information such as the number of plays, the actual numbers to be played, and the amount of wager per play, etc. The subscription information received by agent server 30 is stored in database 33. A subscription play unit (not shown) in game server 37 monitors the subscription play data stored in database 33. For example, if the number of plays entered by the subscriber player is weekly play, the subscription play unit, in connection with data process unit 39 and agent database 33, will put in play the actual numbers selected by the player (stored in database 33) each week. The subscription play unit also monitors the specific number of plays by counting down by one each time the lottery numbers are played until the specified number of play becomes zero. The subscription play unit preferably generates a ‘subscription play complete’ flag and the player is notified of the completion of subscription play by agent server 30. Preferably, the flag is generated prior to or at the expiration of the number of plays or the specified time period and the subscriber player is notified prior to or at the end of subscription play. The notification can be sent by email or sent to the account of the player which the player can access over the global electronic network.

After winning numbers are drawn from each game, the state lottery administrator 40 provides the winning numbers to the agent server 30 or the winning numbers are entered into the agent server 30 after they are publicly announced. The verification unit 35 receives the winning numbers and determines if there are any winning lottery tickets of which ticket numbers match the winning numbers. For the determination, the verification unit 35 accesses the ticket information stored in the agent database 33 which includes the ticket numbers of the lottery tickets purchased. The verification unit 35 then compares the respective ticket numbers with the winning numbers to determine the winning lottery tickets.

Upon determining the winning lottery tickets, the verification unit 35 verifies the winning lottery tickets with the serial numbers previously issued by the state lottery administrator 40. For the verification, the verification unit 35 accesses the serial numbers stored in the agent database 33. Since each of the serial numbers is previously issued in association with each of the purchased lottery tickets and stored in the agent database 33, each of the winning lottery tickets can be verified by confirming the serial numbers of the winning lottery tickets with the corresponding serial numbers retrieved from the agent database 33.

Upon being successfully verified with the corresponding serial numbers, information of the winning lottery tickets including the serial numbers are transmitted from the agent database 33 to the state lottery administrator 40 under control of the data process unit 39. Upon receiving the information and the serial number of the winning tickets, the state lottery administrator 40 issues claim validation numbers associated with the winning tickets. Each of the claim validation numbers is unique to each of the winning tickets. The issued claim validation numbers are stored in the state database 42.

The claim validation numbers are transmitted from the state lottery administrator 40 and stored in the agent database 33 under control of the data process unit 39. The agent server 30 also provides the claim validation numbers to the player terminals 10 of the winning players. Upon receiving the claim validation numbers, the winning players are qualified to claim predetermined lottery awards. That is, the winning players can print a claim form including the claim validation numbers at the player terminals 10, and then claim the predetermined lottery awards by completing and submitting the claim form to the state lottery administrator 40. Upon receiving the claim form with the claim validation numbers, the state lottery administrator 40 accesses the corresponding claim validation numbers previously stored in the state database 42 to verify the claim form and the claim validation numbers received. After successful verification of the claim form and the claim validation numbers, the state lottery administrator 40 allows the banking server 50 to reward the predetermined lottery awards under control of the data process unit 39 to the claimants, i.e., the winning players.

The lottery agent system of the present invention further includes the banking server 50 for crediting and debiting the accounts of the lottery players. The accounts for the use of playing lottery games may be credit card accounts or bank accounts of the lottery players, or separate accounts previously established for the lottery players. Such accounts may be stored in the database 51 of the banking server 50. The player can also purchase prepaid cards, which are similar to prepaid phone cards wherein the cards bear a credit or sum of money to be subtracted down each time a player purchases a ticket. The prepaid cards can be in different denominations purchased at convenience stores by cash or check or online with a credit card. The prepaid card preferably bears a user-id number which the player can enter for identification and proper debiting/crediting by the agent server. The banking server 50 credits the accounts of the respective lottery players who own the winning tickets and claim predetermined lottery awards, and debits the accounts of the respective lottery players for the purchases of the lottery tickets. At the time of every credit or debit, the banking server 50 updates the corresponding accounts in the banking database 51. The banking server 50 may directly communicate with credit card providers 53 of the lottery players. That is, the banking server 50 debits and credits credit card accounts of the lottery players upon purchases of the lottery tickets or wins from the lottery tickets purchased.

Figure 2A:
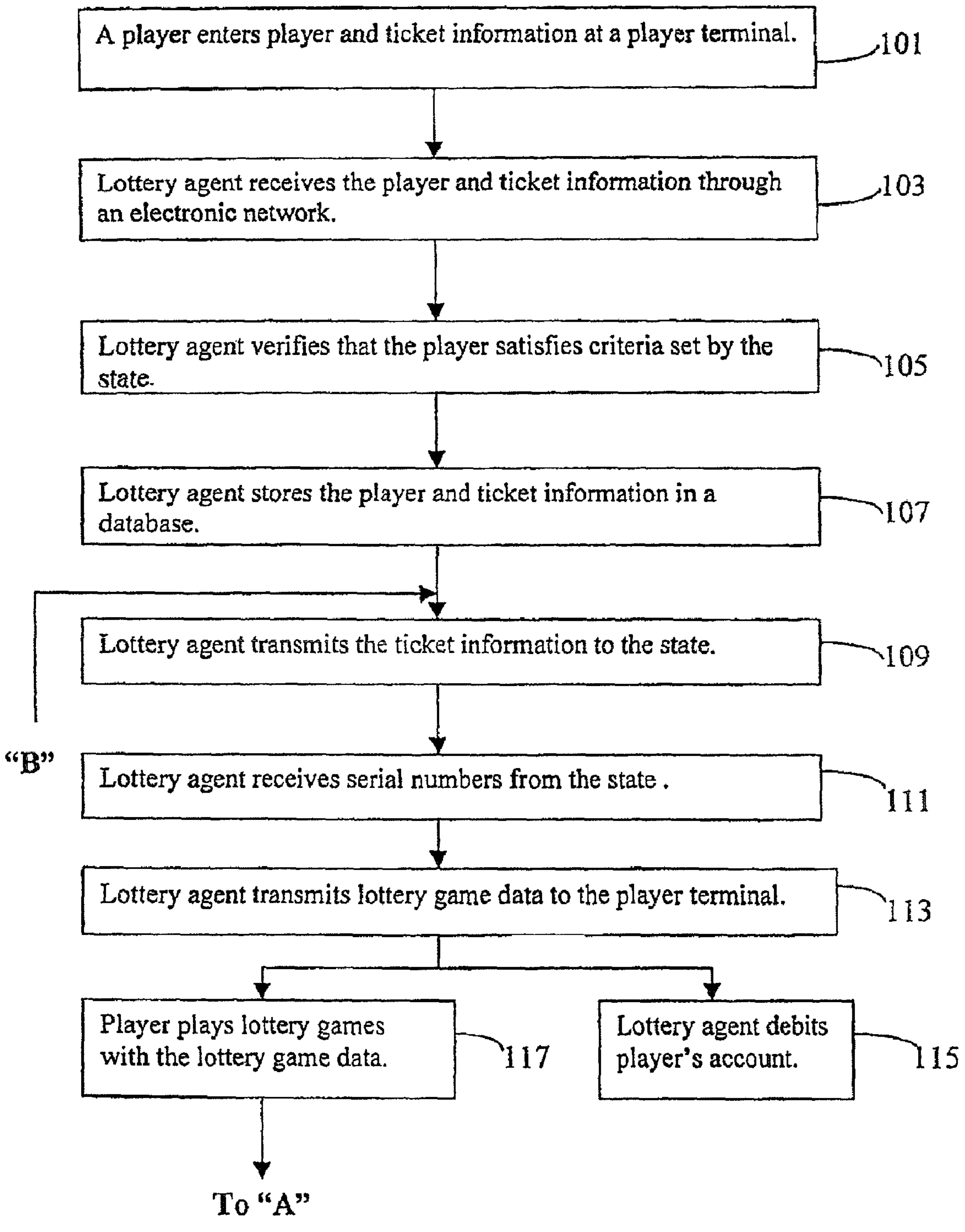
FIGS. 2A and 2B are flow charts describing a method for operating on-line state lottery games according to the present invention.
Figure 2B:
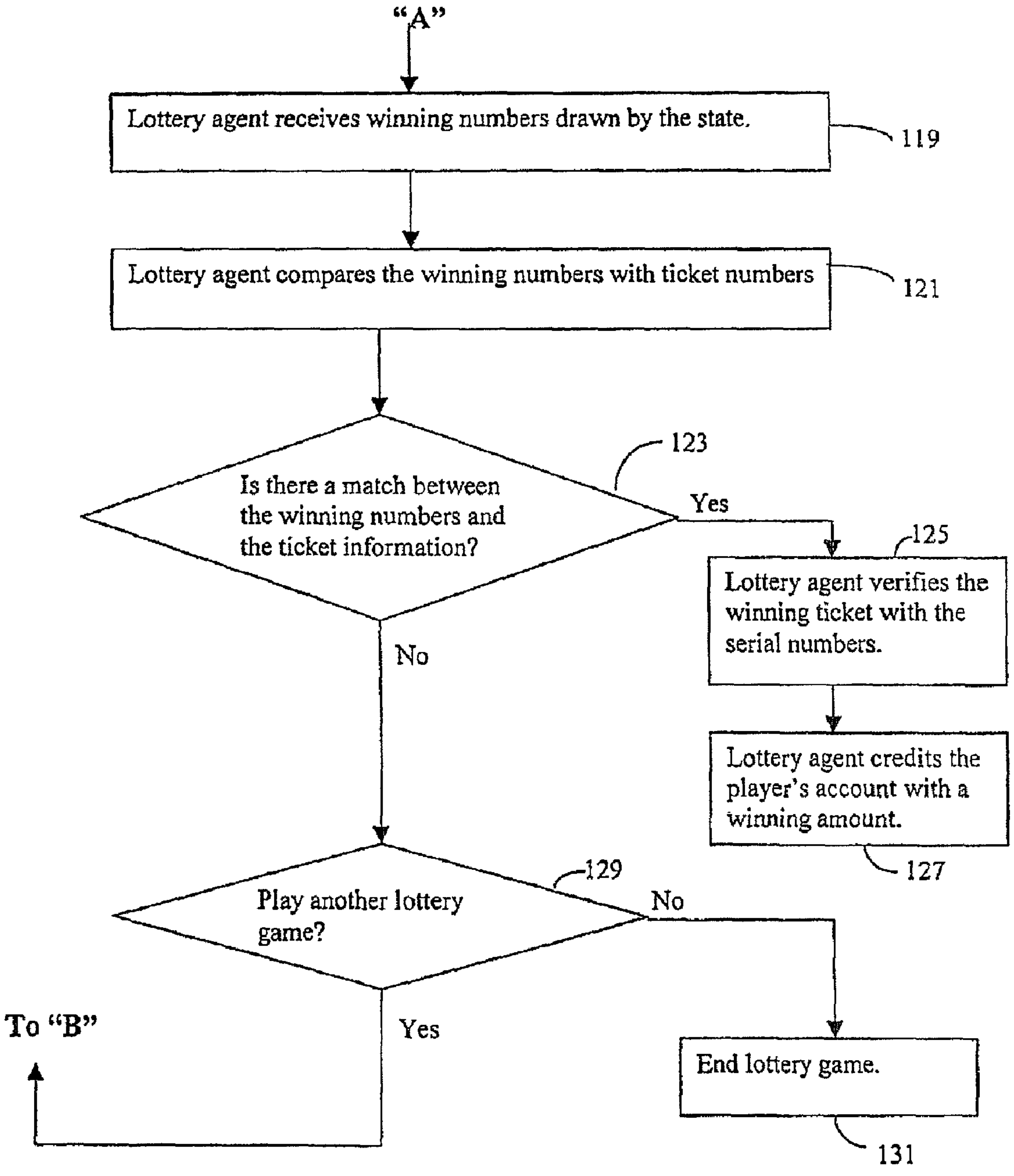

Referring to FIGS. 2A and 2B, a flowchart illustrates a method for facilitating play of on-line state lottery games. To purchase lottery tickets, a lottery player enters his/her player information and ticket information at a player terminal (step 101). The player information may include name, age, address, and account information of the lottery player. The ticket information includes types and numbers of the lottery tickets to be purchased by the lottery player. A lottery agent receives the player and ticket information through an electronic network, such as the Internet (step 103), and verifies that the lottery player satisfies certain criteria required by the state to purchase the state lottery tickets (step 105). For example, the state may require in the criteria that a lottery player must be at least 18 years old and resident in the state.

The lottery agent stores the player and ticket information of the verified player in a database (step 107), and transmits the ticket information to the state, i.e., a state lottery administrator (step 109). The state lottery administrator then issues serial numbers associated with the ticket information after confirming the purchase of the state lottery tickets by the lottery player (step 111). The issued serial numbers, each of which is unique to each of the purchased lottery tickets, are transmitted to the lottery agent. In the case of instant games, the serial numbers can be pre-stored in the database of the agent server for retrieval by the agent server and presented to the player without communication by the agent server to the governmental administrator. After receiving the serial numbers, the lottery agent transmits to the player terminal lottery game data including image data of the lottery tickets (step 113), and at the same time the lottery agent debits the player's account for the purchase of the lottery tickets (step 115) with the lottery game data, the player terminal displays virtual lottery tickets corresponding to the lottery tickets purchased including ticket numbers selected by the player and associated with the serial numbers. The player then plays a lottery game with the virtual lottery tickets displayed on the player terminal (step 117).

After winning numbers are drawn by the state and transmitted to the lottery agent (step 119), the lottery agent compares the winning numbers with the ticket numbers selected by the lottery player (step 121). If there is any match between the winning numbers and the ticket numbers (step 123), the lottery agent verifies the winning ticket with the serial numbers received from the state lottery administrator (step 125). With respect to the verified winning ticket, the lottery agent credits the player's account with a winning amount provided by the state lottery administrator (step 127). If there is no match between the winning numbers and the ticket numbers in the step 123, the lottery agent asks the lottery player whether to play another lottery game (step 129). If the lottery player chooses not to continue the lottery game, the lottery agent ends the player's lottery game (step 131). If the lottery player chooses to play another lottery game, the lottery agent again transmits the ticket information to the state lottery administrator (step 109). Then, the state lottery administrator issues new serial numbers associated with new lottery tickets and provides the new serial numbers to the lottery agent (step 111). Upon receiving the new serial numbers, the lottery agent repeats the steps 113 to 131 as described above.

Figure 3:
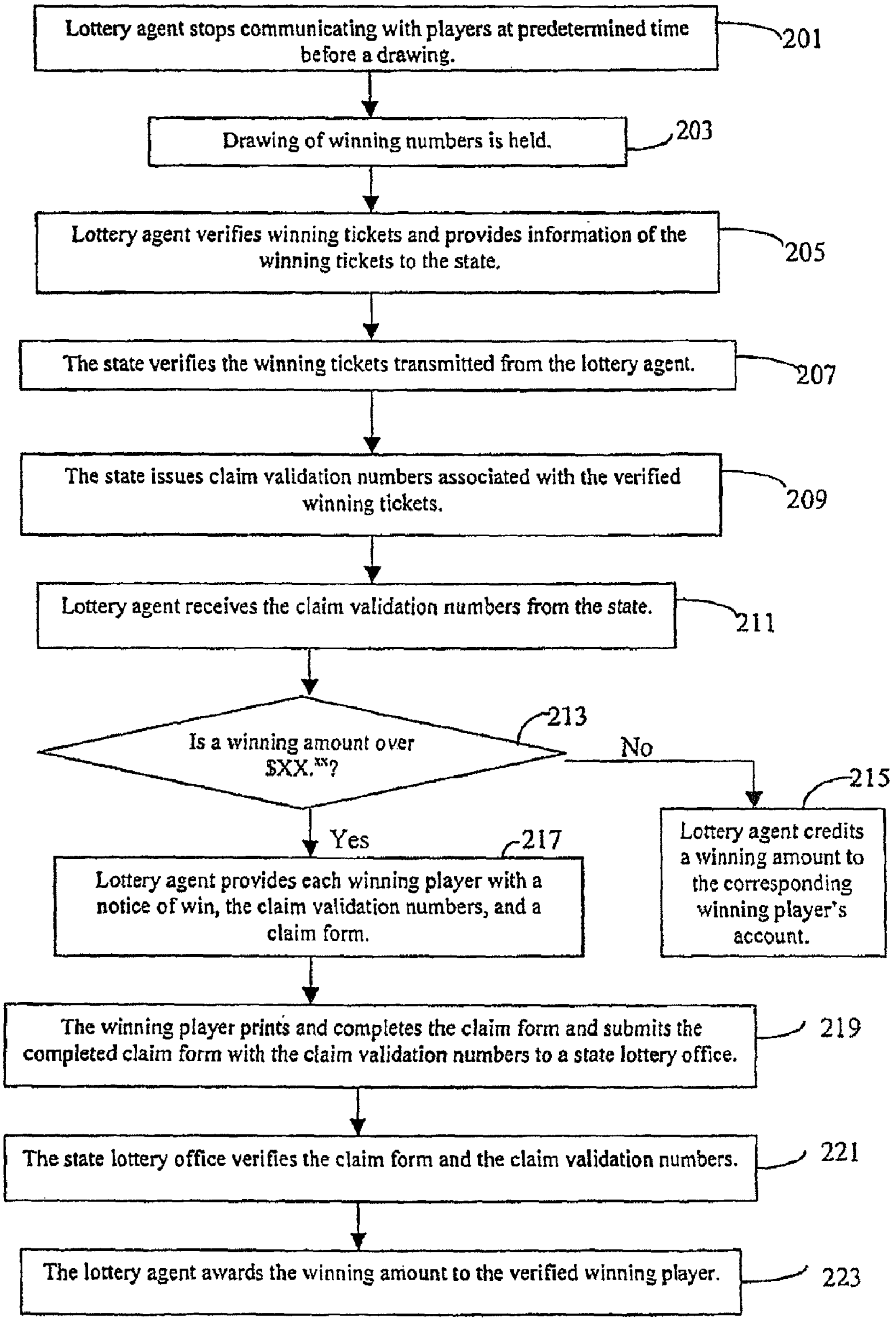
FIG. 3 is a flow chart describing a series of steps for claiming awards for winning lottery tickets.

Referring to FIG. 3, a flow chart illustrates a series of steps for claiming awards for wins in playing lottery games. At a predetermined time before a drawing of winning numbers, a lottery agent managing the lottery games stops communicating with lottery players (step 201). Thus, the lottery players cannot purchase lottery tickets after a predetermined time before a drawing of the winning numbers. After the winning numbers are drawn so that winning tickets are determined (step 203), the lottery agent verifies the winning tickets with the ticket information previously provided by the lottery player and provides the information of the winning tickets to the state (step 205). The verification of the winning tickets includes confirming the winning tickets with serial numbers previously issued by the state in association with the respective winning tickets.

Upon receiving the information of the winning tickets, the state verifies the winning tickets with the ticket information previously stored in a database of the state (step 207). The state then issues claim validation numbers each of which is associated with each of the verified winning tickets (step 209). The claim validation numbers are stored in the state and transmitted to the lottery agent (step 211).

Upon receiving the claim validation numbers associated with the winning tickets, the lottery agent determines whether a winning amount of each winning ticket is over a certain amount of money (step 213). If the winning amount is not over a certain amount of money, the lottery agent credits the winning amount to an account of the corresponding winning player (step 215). If the winning amount is over a certain amount of money, the lottery agent provides each winning player with a notice of win, the claim validation numbers, and a claim form, preferably, via the Internet (step 217). The winning player then prints and completes the claim form and submits the completed claim form with the claim validation numbers to a state lottery office administering the state lottery games (step 219). The state lottery office verifies the claim validation numbers submitted by the winning player with the corresponding claim validation numbers previously stored in the state (step 221). Upon verifying the claim validation numbers, the state allows the lottery agent to award the winning amount to the winning player (step 223).

An exemplary embodiment of the present invention provides a screening unit and method of geographic location verification. The use of the screening unit and method is not limited to lottery play and may be employed for any activity where verifying the geographic location of a participant of an electronic network activity is desired.

Figure 4:
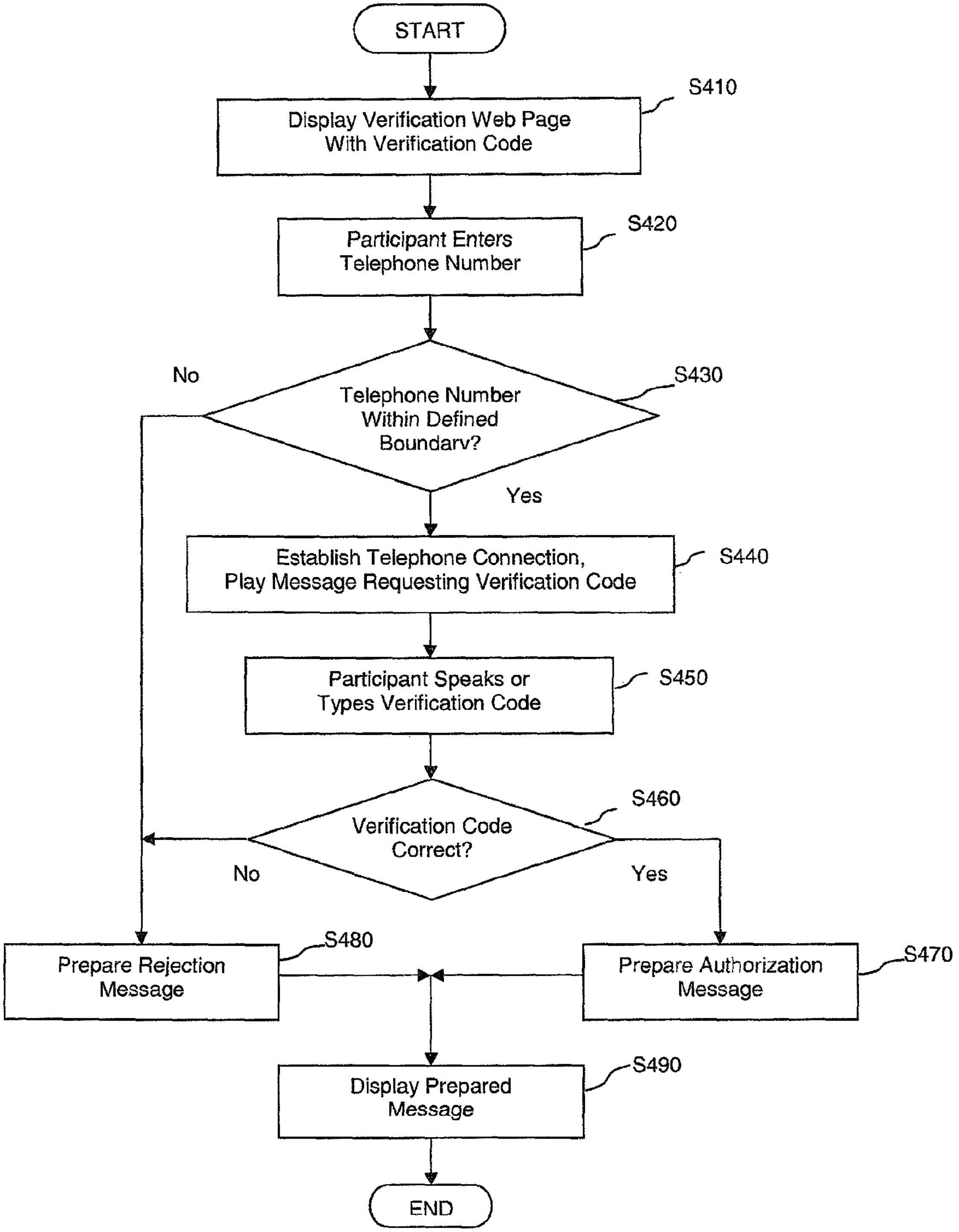
FIG. 4 is a flow chart describing a series of steps for verifying a geographic location according to an exemplary embodiment of the present invention.

FIG. 4 is a flow chart describing a series of steps for verifying a geographic location according to an exemplary embodiment of the present invention. The geographic location verification screening unit and method may utilize a verification link displayed on the web site of the governmental agency, such as where lottery tickets are purchased. Upon activating the verification link, a verification web page is displayed (step 410) and the participating player is prompted to enter a telephone number within the government defined geographic boundary, such as state, where the participating player can presently be reached. The system will also provide the participating player with a verification code, such as a random number code (RNC). The participating player then enters a telephone number of a telephone positioned in close proximity to the participating player (step 420) into an appropriate field on the verification web page. The screening unit or other government agent receives the entered telephone number and verifies (step 430) that the telephone exchange information, such as the area code, is in a valid government defined boundary, e.g., state. If the telephone exchange information is not in a valid government defined boundary, a rejection message is communicated to the participating player (step 480). If the telephone exchange information is in a valid government defined boundary, the screening unit calls the entered telephone number (step 440). When the participating player answers, the screening unit plays a message (step 440) prompting the participating player to speak or enter the provided verification code, e.g., RNC, (step 450). The screening unit verifies that the entered verification code is correct (step 460). The screening unit can determine whether the participating player is located in close proximity to a telephone within the government defined boundary, e.g., state, at that time, since the participating player is limited in time to respond. If the participating player provided the correct verification code, an authorization message is communicated to the participating player (step 470), otherwise a rejection message is communicated to the participating player (step 480). The authorization or rejection is then displayed on a web page (step 490) for the participating player to view. Based on that authorization, the system will allow the electronic network activity, e.g., lottery ticket sale, to proceed.

The verification code may be the previously described RNC or the agency may instruct the participating player to provide any other data on file for identification, such as an account number, a portion of a government issued identification number, or a credit card number.

Figure 5:
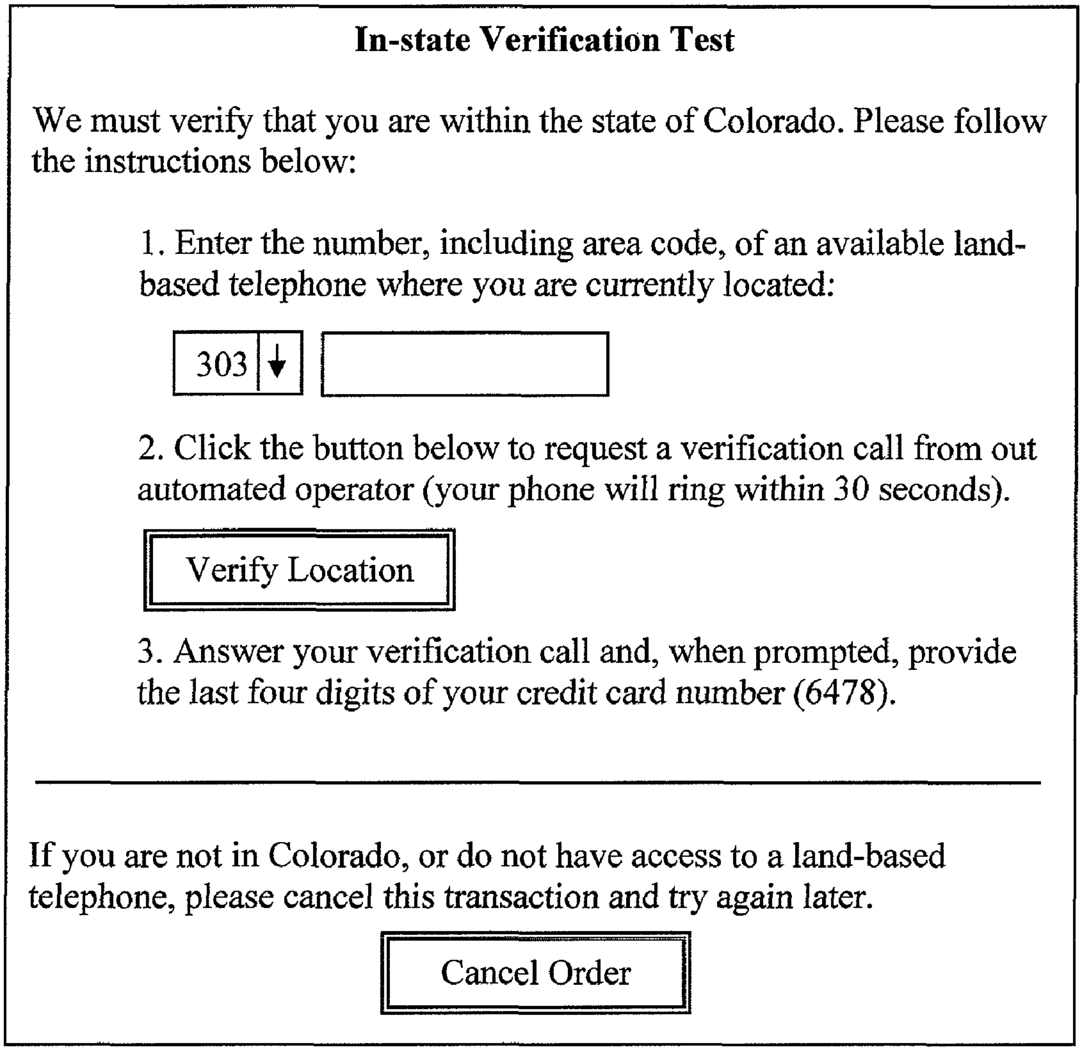
FIG. 5 illustrates a geographic location verification web page according to an exemplary embodiment of the present invention.

FIG. 5 illustrates a geographic location verification web page according to an exemplary embodiment of the present invention. Referring to FIG. 5, instructions may be provided to the participating player to follow to perform the geographic location verification procedure on a verification web page. A field is displayed for the participating player to enter a telephone number of a telephone positioned in close proximity to the participating player and a verification code is displayed for the participating player to communicate to further verify that the telephone call is in response to the verification procedure.

Once the telephone verification is complete, the lottery system has determined that the person transacting business on this account is located in close proximity to a telephone in the proper geographic region including the proper state.

Exemplary embodiments of the present invention may also utilize one or more mobile positioning techniques for determining the geographic location of the lottery player and using this location information to verify that the lottery player satisfies criteria concerning the present location of the lottery player. Such techniques may be particularly useful when the lottery player is using a mobile player terminal such as a laptop computer, cellular telephone, smartphone, PDA or other portable computer device. However, these techniques may also be used from a stationary player terminal such as a desktop computer with a wired Internet connection.

According to these techniques, the lottery player's location information may be acquired by positioning hardware and/or software located within the mobile terminal and/or at a base station. Location information may be acquired by global positioning system (GPS), cellular telephone localization, and/or WiFi localization. Where location information is acquired at the mobile terminal, the location information may be securely transmitted to the screening unit, for example, the location information may be transmitted in an encrypted form and/or with a digital signature. Secure transmission may be used to prevent a lottery player from tampering with the player terminal software application installed on the player's mobile device and spoofing false location information. For example, the player's username may be encrypted and watermarked into the location information so that the location information may be accurately associated with the particular user.

As described above, the player's location may be ascertained by employing one or more of the following localization techniques: GPS, cellular telephone localization and WiFi localization. GPS localization and WiFi localization may be performed at the mobile terminal while cellular telephone localization may be performed either at the mobile terminal or at the mobile base station. The mobile terminal software may select one or more of these approaches depending on the capabilities of the player terminal being used. For example, if the player terminal is equipped with a GPS device, localization may be performed using the GPS device. If the player terminal is equipped with a WiFi adapter, WiFi localization may be performed. Modern cellular telephones sold in the United States are equipped with a localization-based system (LBS) for determining the approximate location of the cellular telephone subscriber, and thus this technology may be employed for the purposes of determining the player's location.

GPS localization is the process of monitoring signals sent from a constellation of satellites in orbit around the earth. By triangulating the received satellite signals, the precise location of the player's terminal may be identified. GPS localization may be performed by a GPS receiver that may be integrated into the player's mobile terminal or stationary terminal or attached thereto as a peripheral. In addition to or as an alternative to GPS localization, other satellite localization systems may be used, for example, GLONASS (Russia), Galileo (Europe), COMPASS (China), and IRNSS (India). Although the GPS system technically refers to the NAVSTAR GPS developed by the United States Department of Defense, as used herein, the term GPS may refer to any satellite-based positioning system such as those listed above.

Cellular telephone localization is the process of triangulating the location of the player terminal based on the distance between the mobile terminal and a plurality of cellular towers. Distance may be calculated based on signal strength, signal travel time, and/or the angle of signal arrival. Triangulation may be performed by the mobile terminal by analyzing the travel distance of signals received from a plurality of towers (handset-based localization) or triangulation may be performed by the base station by analyzing the travel distance of signals received from the mobile terminal at a plurality of towers (network-based localization). Thus cellular localization may be performed at the server side or client side.

Examples of cellular telephone localization systems are as follows: cell identification, enhanced cell identification, Time Difference of Arrival (TDOA), Time of Arrival (TOA), Angle of Arrival (AOA), E-OTD, and/or assisted GPS (A-GPS).

Similarly, WiFi localization triangulates the position of the mobile terminal by analyzing the travel distance of received WiFi signals from WiFi hot spots with a known fixed location. Proprietary WiFi hotspots may be particularly suited for this purpose as their locations may be easily known by the network proprietor. In some exemplary embodiments of the present invention, WiFi localization may be combined with cellular telephone localization to provide a more robust and accurate localization system.

Figure 6:
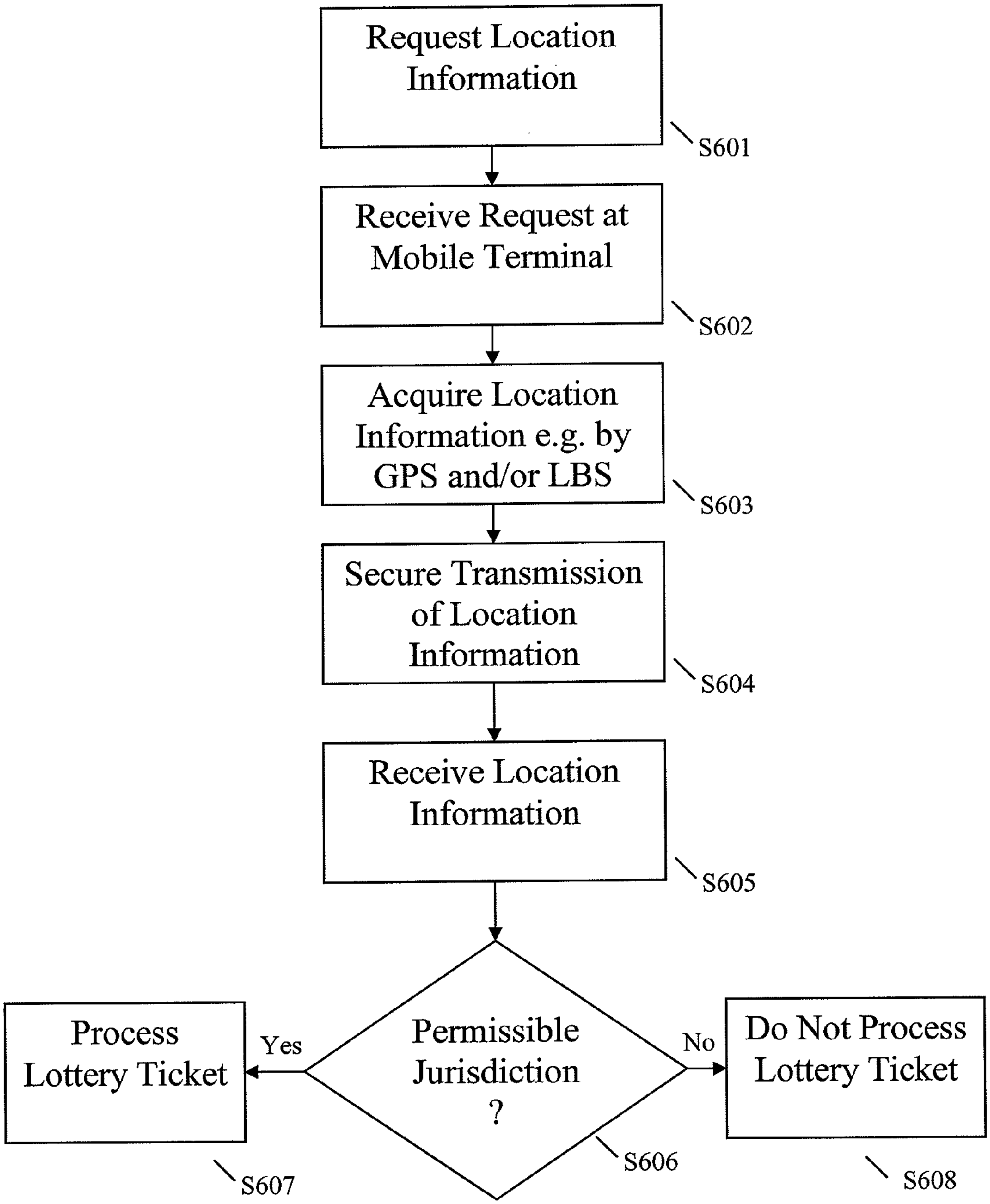
FIG. 6 is a flow chart illustrating a method for a lottery agent verifying the location of a lottery player according to an exemplary embodiment of the present invention.

By using one or more of the above-described localization techniques, the present location of a player using a mobile terminal may be accurately obtained and used to ensure that a player is within the borders of a particular jurisdiction before a lottery ticket transaction is processed. FIG. 6 is a flow chart illustrating a method for a lottery agent verifying the location of a lottery player according to an exemplary embodiment of the present invention. First, the lottery agent may send a request for location information to the mobile player terminal (Step S601). Where the mobile player terminal is connected to the Internet over a wireless network such as a cellular network or a WiFi network, the request may be transmitted over the Internet and the wireless network. The request may then be received by the mobile player terminal (Step S602). The mobile player terminal may then perform localization, using one or more of GPS, cellular localization and WiFi localization to acquire location information (Step S603). The mobile player terminal may then securely send the acquired location information to the lottery agent via the mobile network and the Internet (Step S604). Secure sending may include encrypting, digitally signing and/or watermarking the location information to prevent location spoofing. Where the location information is acquired at the base station, the location information may either be sent directly to the lottery agent or may be sent via the mobile terminal. The lottery agent may then receive the location information (Step S605) and interpret the received location information to determine whether the player's location is within a permissible jurisdiction (Step S606), for example, by analyzing the coordinates of the player's location and comparing it to a map of the permissible jurisdiction. If it is determined that the player's location is within the permissible jurisdiction (Yes, Step S606) then the purchase of the lottery ticket may be performed, for example, in accordance with the description provided above. If it is determined that the player's location is not within the permissible jurisdiction (No, Step S606) then the transaction may be prevented. These steps may be considered part of the verification step described above with reference to step 105 of FIG. 2A. Thus, the player's location may be accurately gauged prior to sending information to the state and debiting the player's account.

As described above, exemplary embodiments of the present invention may utilize the capabilities of a television service provider (TSP) to provide a network infrastructure and subscriber relationship to manage the purchase of lottery tickets by the user over a television system. Moreover, in many cases, monetary transactions such as collecting fees for lottery ticket purchases and/or the disbursement of lottery winnings may be performed by or with the aid of the TSP. Screening, such as checking for geographic location, age and residency requirements may also be performed by the TSP or with the use of data collected and managed by the TSP.

As referred to herein, a television service provider (TSP) may be any organization or entity that provides synchronized audio and video content to one or more users for display on a television or other display device. Examples of TSP may include "wired" service providers such as cable television companies, and fiber optic television providers. Other examples of TSPs may include "wireless" service providers such as satellite television providers, over-the-air broadcast television networks, and so called, "wireless cable" networks that may transmit synchronized audio and video content over microwave frequencies.

TSPs may also combine wired and wireless technologies to provide two-way communications, whereby upstream communication from the user to the TSP is provided by a wired network such as telephone lines or the Internet, while downstream communication from the TSP to the user is provided by a wireless network such as a satellite TV network.

While TSPs are most commonly regional, exemplary embodiments of the present invention need not be implemented on a large scale. For example, exemplary embodiments of the present invention may be implemented on local-area television networks such as closed-circuit television networks, hotel television networks, and cruise ship television networks. Accordingly, as used herein television service providers (TSPs) may indicate any provider of synchronized audio and video content, be it over wires, wireless or some combination thereof, or be it wide area or small area.

As used herein, "synchronized audio and video content" may refer to a system that is configured to deliver synchronized audio and video content such as movies and television programs, regardless of whether the systems are actually used to deliver synchronized audio and video content.

Figure 7:
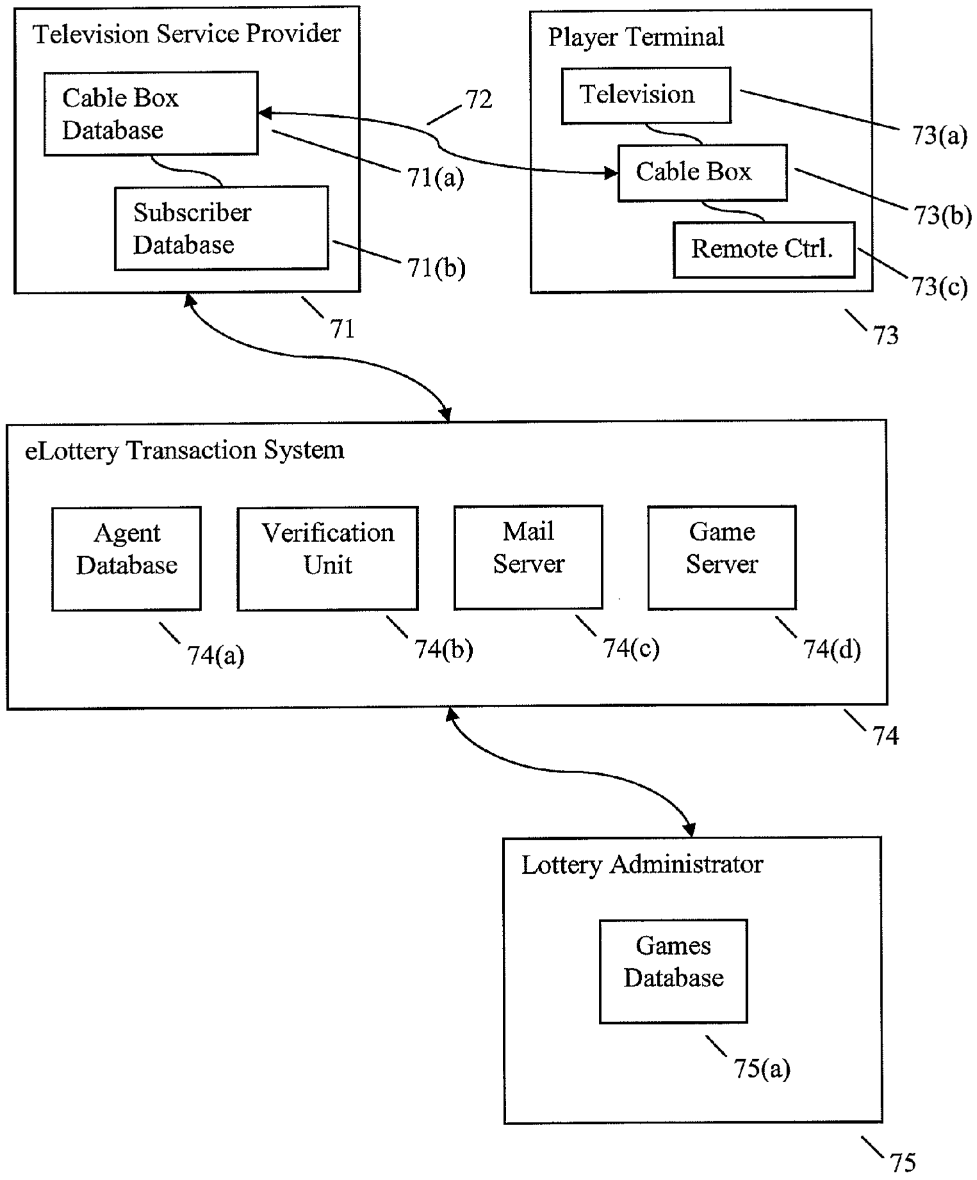
FIG. 7 is a schematic diagram illustrating a system for operating a governmental lottery game with a television-based user terminal, according to an exemplary embodiment of the present invention.

FIG. 7 is a schematic diagram illustrating a system for operating a governmental lottery game with a television-based user terminal, according to an exemplary embodiment of the present invention. The player terminal 73 may be the interface between the user and the lottery system. The player terminal 73 may include a television or monitor 73(*a*), a cable box 73(*b*) connected to the television 73(*a*) and a remote control device 73(*c*) for controlling the cable box 73(*b*) and/or the television 73(*a*). The television 73(*a*) may be a digital or analog display device that may or may not include a television tuner device. Accordingly, the television 73(*a*) may be a standard definition TV, an HDTV or a computer monitor. The cable box 73(*b*) may be embodied as a set-top box of the type commonly provided by cable TV operators, may be a general-purpose computer system such as a media center PC, or may be any of a variety of other set-top-boxes or specific-purpose computer systems, video game consoles, or the like. The cable box functionality may alternatively be integrated into the television 73(*a*). Where the cable box 73(*b*) is a device other than a standard set-top-box provided by a cable TV operator, the non-standard device may include support for a cableCARD provided by the cable TV operator. The remote control 73(*c*) may optionally be included, and may be a wired or wireless console for controlling the function of the television 73(*a*) and/or the cable box 73(*b*). The remote control 73(*c*) may be a standard infrared-type device such as those normally used with televisions, or it may be a computer keyboard and/or tracking device such as a mouse, touchpad or the like.

A "CableCARD" is a technology created by the United States cable television industry in response to requirements set by the Telecommunications Act of 1996 that allows for third-party set-top-boxes and televisions with cableCARD support to access a digital cable network. The term cableCard may refer to an actual card that can be inserted into the set-top-box or cableCARD enabled television, or it may refer to another means of access such as a password, microchip, or the like. CableCARD technology may conform to a set of standards promulgated by Cable Television Laboratories (CableLabs), is a non-profit research and development consortium headquartered in Louisville, Colo. CableCARD standards, available at htt://www.cablelabs.com/, including 1.0 and 2.0 are incorporated herein by reference.

The player terminal 73 may be connected to a television service provider network 71 via a "last-mile" connection 72. The so called last-mile connection 72 may utilize any available approach for delivering content into the home or other location where the player terminal 73 may be located. This connection may be a coaxial cable line, fiber optical lines, POTS telephone lines, DSL, Ti, Ethernet lines, WiFi wireless channels, WiMax wireless channels, microwave channels, and the like. While exemplary embodiments of the present invention may be disclosed herein with reference to a "cable TV" network, this description is offered for convenience, and it is to be understood that the invention is not limited to cable lines, but may include all other available and future last-mile delivery systems.

The television service provider (TSP) 71 may include one or more antennas, satellite dishes, network interfaces, servers, switching devices, and other means for receiving television content and network traffic and providing subscription content to various users in accordance with each user's subscribed channels and features. The TSP 71 may thus manage the reception of content and dissemination of content to the various users. The TSP 71 may also manage user accounts, process on-demand content, and may manage user payment accounts. Particularly, the TSP 71 may include a cable box database 71(*a*) for managing the content that is sent to each user's cable box 73(*b*) and a subscriber database 71(*b*) for storing information pertaining to each subscriber including address, residency, personal identification number (PIN) information, and age information for one or more registered users.

Where the TSP 71 is a wide area service network, such as a community cable provider, the TSP 71 may be located within a central station. There may also be one or more substations located throughout the coverage area for facilitating the provision of service, and each substation may perform one or more of the tasks of the TSP 71. Where the TSP 71 is a local area network, such as a hotel or cruise ship television system, the TSP 71 may be located in a server room or operations room. Where the TSP 71 uses a wireless delivery for the connection 72, the wireless delivery may be handled by multiple base stations.

The TSP 71 may be in communication with an eLottery transaction system 74, for example, over the Internet or some other data communication means. Alternatively, the eLottery transaction system 74 may be located within the television service provider 71 facility and may be in communication therewith via a local area network. The eLottery Transaction system 74 may be an agent server for implementing a method for operating a government lottery game with television-based user terminals according to an exemplary embodiment of the present invention. The eLottery Transaction system 74 may include an agent database 74(*a*) for storing the player and ticket information and serial numbers generated by a state lottery administrator 75, a verification unit 74(*b*) for verifying winning tickets based on the ticket information and serial numbers after a drawing of winning numbers, a game server 74(*d*) for storing and providing various types of lottery games. These units may be as described above with respect to FIG. 1 and additional detail will not be repeated. The eLottery Transaction system 74 may also include a mail server 74(*c*), which may be an email server and/or a notification/communication server that may be used to manage correspondence between the player terminal 73, the TSP 71 and the lottery administrator 75 and may also be used to send communications directly to the player via email or other means that may or may not involve the use of the player terminal 73. The TSP may include one or more of the features described above with respect to the agent server 30 of FIG. 1.

The Lottery Administrator 75 may be a government-maintained and secure server for providing lottery ticket serial numbers. The Lottery Administrator 75 may include one or more of the features described above with respect to the state lottery administrator 40 of FIG. 1. The Lottery Administrator 75 may include a games database 75(*a*) that includes the parameters for generating lottery ticket serial numbers, generating winning numbers, and generating instant win-type lottery game results.

Figure 8:
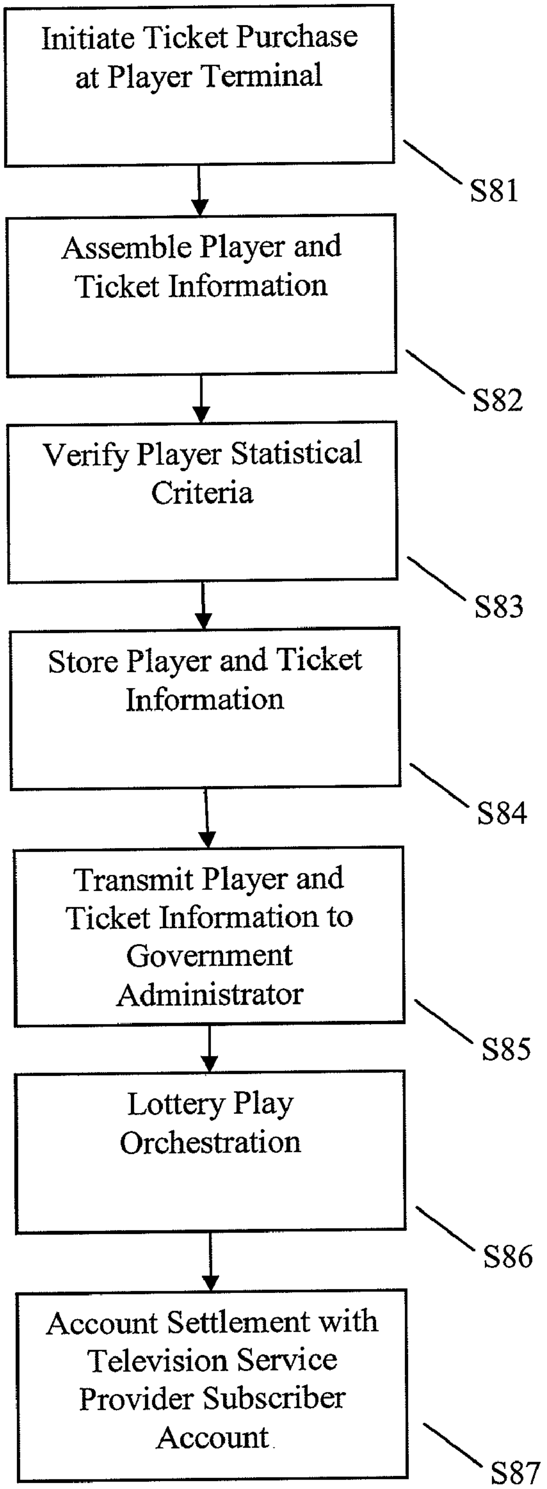
FIG. 8 is a flow chart illustrating a method for operating a governmental lottery game with a television-based user terminal, according to an exemplary embodiment of the present invention.

FIG. 8 is a flow chart illustrating a method for operating a governmental lottery game with a television-based user terminal, according to an exemplary embodiment of the present invention. First, a player may initiate a ticket purchase form the player terminal (Step S81). Initiation of ticket purchase may involve using a remote control to select a particular channel, for example, an eLottery channel. In initiating the ticket purchase, the player may select a desired game, for example, by interacting with the remote control and observing the television screen. Here the player may be prompted to enter a PIN code to authenticate the player as a registered user. This process may be similar to the current process by which users can request on-demand and/or pay-per-view programming. For example, many cable systems have particular systems in place for restricting the request for "mature content" only to those authorized customers of a particular age, such systems may be adapted for use in this context. For example, the player may be prompted to navigate a series of on-screen menus, for example, by pressing arrow buttons on the remote control, and may be prompted to enter a PIN code using the number pad on the remote control.

As the player navigates the menus, control information may be relayed to the TSP whose servers may then customize the television signal sent to the player's television accordingly. The player may thus have the experience of operating a player terminal, while the player terminal logic is really handled at the TSP side, with the player terminal acting as a dummy terminal or thin client.

Player and ticket information may then be assembled (Step S82). Player and ticket information may be assembled from the initiated ticket purchase information and from the cable box database and player database at the TSP. For example, the PIN entered by the player may be used to verify that the player is a registered and authorized player. The cable box database may be consulted to identify the service account associated with the particular cable box, and the player database may be consulted to identify personal data associated with the authorized player. This personal data may include the player's age and region of residency, while the cable box database may include information pertaining to the physical location of the cable box. The player database may have been previously populated with data collected by the player during a registration process or the player database may be populated by information obtained by the player at the point of the ticket purchase initiation.

The age of the player may be verified, for example, in person at a local office of the television service provider or, for example, by the TSP technician that travels to the home of the player when installing the cable box. This age verification may be required to activate the eLottery account on the player's terminal in a process that is similar to subscribing to a premium channel.

Because each cable box is positively associated with a particular player account, and the geographic location of the cable box is precisely known, the eLottery system can have a high degree of confidence in the player's location, age and residency. Accordingly, in the next step, it may be verified that the player satisfies the required criteria (Step S83). This verification may be performed either by the TSP or by the eLottery Transaction System, or at both locations. For example, this verification may be performed at the eLottery Transaction System by the verification unit, which may compare the player's personal information against a set of known criteria that is provided by a governmental lottery administrator.

The eLottery Transaction System may then store player and ticket information in a database (Step S84), for example, an agent database. The player and ticket information may then be transmitted to the governmental lottery administrator (Step S85). The governmental lottery administrator may then provide a lottery ticket serial number. Where the player is playing a game that involves the selection of numbers, the selected numbers may be transmitted to the government lottery administrator as part of the player and ticket information. Where the player is playing an instant win-type game, the serial number provided by the government lottery administrator may include an indication of win or loss along with an amount won, where appropriate.

The eLottery Transaction system may then orchestrate a game play (Step S86). In orchestrating game play, the eLottery system may allow the player to play a game where the ultimate outcome of the game is predetermined and provided by the government lottery administrator. Accordingly, the player may select a desired game and the desired game may be orchestrated according to the player's selection. Where the player selects numbers, as with a traditional lottery drawing, when winning numbers are selected by the government lottery administrator, the winning numbers may be sent to the eLottery Transaction System and the game outcome may be presented to the player as part of the game orchestration.

Potential winnings, along with game fees may be settled with the TSP's subscriber accounts (Step S87). Accordingly, game fees may be billed directly to the subscriber account in a manner similar to the charging for an on-demand/pay-per-view movie. Where the player has earned winnings, the winnings may be credited to the subscriber account to offset game fees or ordinary cable service fees. Where winnings exceed a predetermined threshold, winnings may be paid directly by the government lottery administrator in a manner consistent with the way lottery winnings are ordinarily claimed.

Alternatively, game fees may be paid for by credit card or another form of account that is not managed by the TSP. In either event, the player may be able to use the player terminal to view account balances, games won and lost, and control various game options.

Thus, the system and the method for operating on-line state lottery games according to the present invention provides the lottery players with not only convenient and readily accessible lottery play but also more reliable security on the information for playing the state lottery games. Therefore, the present invention may facilitate lottery games so as to encourage patrons to play lottery games more frequently.

Having described preferred embodiments of a system and a method for playing electronic lottery games according to the present invention, it is noted that modifications and variations can be made by persons skilled in the art in light of the above teachings.

It is also to be understood that the above embodiments are intended to be illustrative, and that any changes may be made in the particular embodiments disclosed, which are within the scope and spirit of the invention as outlined by the appended claims.

What is claimed is:

1. A method for facilitating governmental lottery play over television, comprising:

receiving a lottery ticket purchase request from a player terminal including a television over a communication network of a television service provider and transmitting the received lottery ticket purchase request to an agent server, configured to process lottery ticket purchase requests transmitted from a plurality of player terminals, in communication with the television service provider over the Internet;

retrieving player information pertaining to a player from a subscriber database of the television service provider;

verifying that the player satisfies predetermined criteria required by a lottery administration entity based on the retrieved player information using a verification unit of the agent server; and processing the purchase of a lottery ticket based on the received lottery ticket purchase request when it is verified that the player satisfies the predetermined criteria, wherein the processing of the purchase of the lottery ticket includes receiving a serial number, at the agent server, from a separate lottery administrator server maintained by the lottery administration entity and configured to generate serial numbers associated with purchased lottery tickets.

2. The method of claim 1, wherein the lottery ticket purchase request is generated by the player's interaction with a set-top-box that is part of the player terminal, via a remote control.

3. The method of claim 1, wherein the television service provider is a cable television provider and the television service provider communication network is a cable television network.

4. The method of claim 1, wherein the television service provider is a fiber optic television provider and the television service provider communication network is a fiber optic television network.

5. The method of claim 1, wherein the television service provider is a satellite television provider and the television service provider communication network is a satellite television network.

6. The method of claim 1, wherein the television service provider is a local area hotel or cruise ship television system and the television service provider communication network is local television system.

7. The method of claim 1, wherein the lottery ticket purchase request includes a personal identification number (PIN) that is provided by the player in order to access restricted content or services.

8. The method of claim 1, wherein the subscriber database includes the location, residency and age of the player.

9. The method of claim 1, wherein verifying that the player satisfies predetermined criteria based on the retrieved player information includes verifying that the player lives in and is located within a particular geographic jurisdiction and verifying that the player is of at least a certain age.

10. The method of claim 1, wherein a lottery ticket purchase fee is settled via the television service provider's subscriber account.

11. The method of claim 1, wherein lottery ticket winnings are settled via the television service provider's subscriber account when the winnings are below a particular threshold and lottery ticket winnings are settled via the lottery administration entity when the winnings are above the particular threshold.

12. A system for facilitating a governmental lottery play over television, comprising:

a player terminal with a display device, a digital television provision unit, and a console for the digital television provision unit, the player terminal receiving a lottery ticket purchase request from a player and transmitting the lottery ticket purchase request, over a communication network of a television service provider to the television service provider, the television service provider transmitting the lottery ticket purchase request to an agent server, configured to process lottery ticket purchase requests transmitted from a plurality of player terminals, over the Internet;

a subscriber database for retrieving player information pertaining to the player;

a verification unit of the agent server for verifying that the player satisfies predetermined criteria required by a lottery administration entity based on the retrieved player information;

a lottery transaction server, comprising the agent server, for processing the purchase of a lottery ticket based on the received lottery ticket purchase request when it is verified that the player satisfies the predetermined criteria; and a separate government lottery administrator server maintained by the lottery administration entity for providing information for determining whether the purchased lottery ticket is a winning ticket or a losing ticket and for generating serial numbers associated with purchased lottery tickets, wherein the processing of the purchase of the lottery ticket includes receiving a serial number, at the agent server, from the government lottery administrator server.

13. The system of claim 12, wherein the display device is a television set and the digital television provision unit is a television set-top-box.

14. The system of claim 13, wherein the television set-top-box is a cable box.

15. The system of claim 13, wherein the television set-top-box is a cableCARD enabled set-top-box.

16. The system of claim 12, wherein the display device and the television set-top-box are embodied in a single television device that is cableCARD enabled.

17. A method for facilitating governmental lottery play over television, comprising:

receiving a lottery ticket purchase request from a player terminal with a display device, a digital television provision unit, and a console for the digital television provision unit, over a communication network of a television service provider and transmitting the received lottery ticket purchase request to an agent server, configured to process lottery ticket purchase requests transmitted from a plurality of player terminals, in communication with the television service provider over the Internet;

retrieving player information pertaining to a player from a subscriber database of the television service provider;

verifying that the player satisfies predetermined criteria required by a lottery administration entity based on the retrieved player information using a verification unit of the agent server; and processing the purchase of a lottery ticket based on the received lottery ticket purchase request when it is verified that the player satisfies the predetermined criteria, wherein the processing of the purchase of the lottery ticket includes receiving a serial number, at the agent server, from a separate lottery administrator server maintained by the lottery administration entity and configured to generate serial numbers associated with purchased lottery tickets.

18. The method of claim 17, wherein the display device is a television set and the digital television provision unit is a cableCARD enabled set-top-box or a cable box.

19. The method of claim 17, wherein the television service provider is a cable television provider and the television service provider communication network is a cable television network.

20. The method of claim 17, wherein the television service provider is a fiber optic television provider and the television service provider communication network is a fiber optic television network.

* * * * *